Patented Jan. 26, 1926.

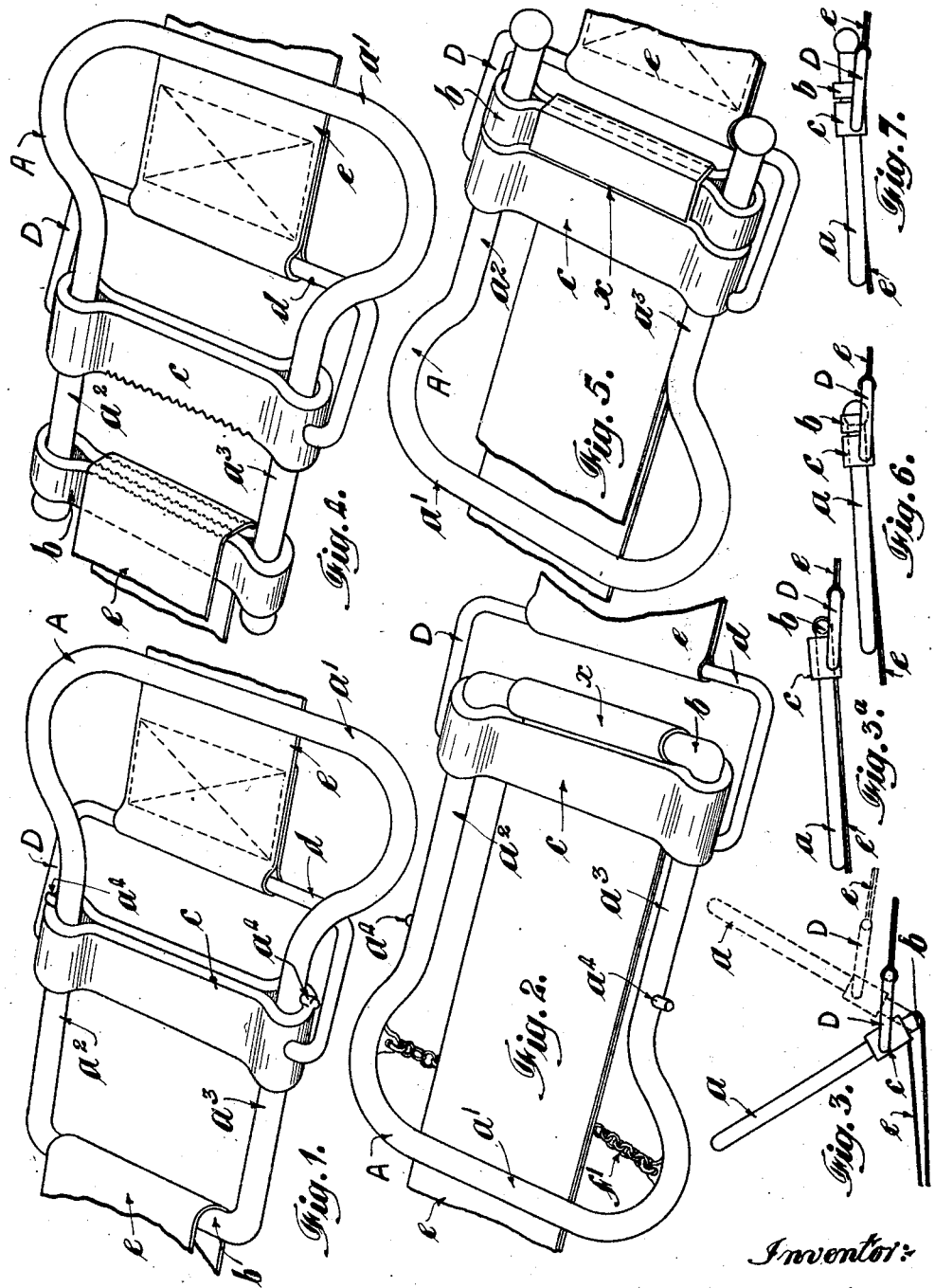

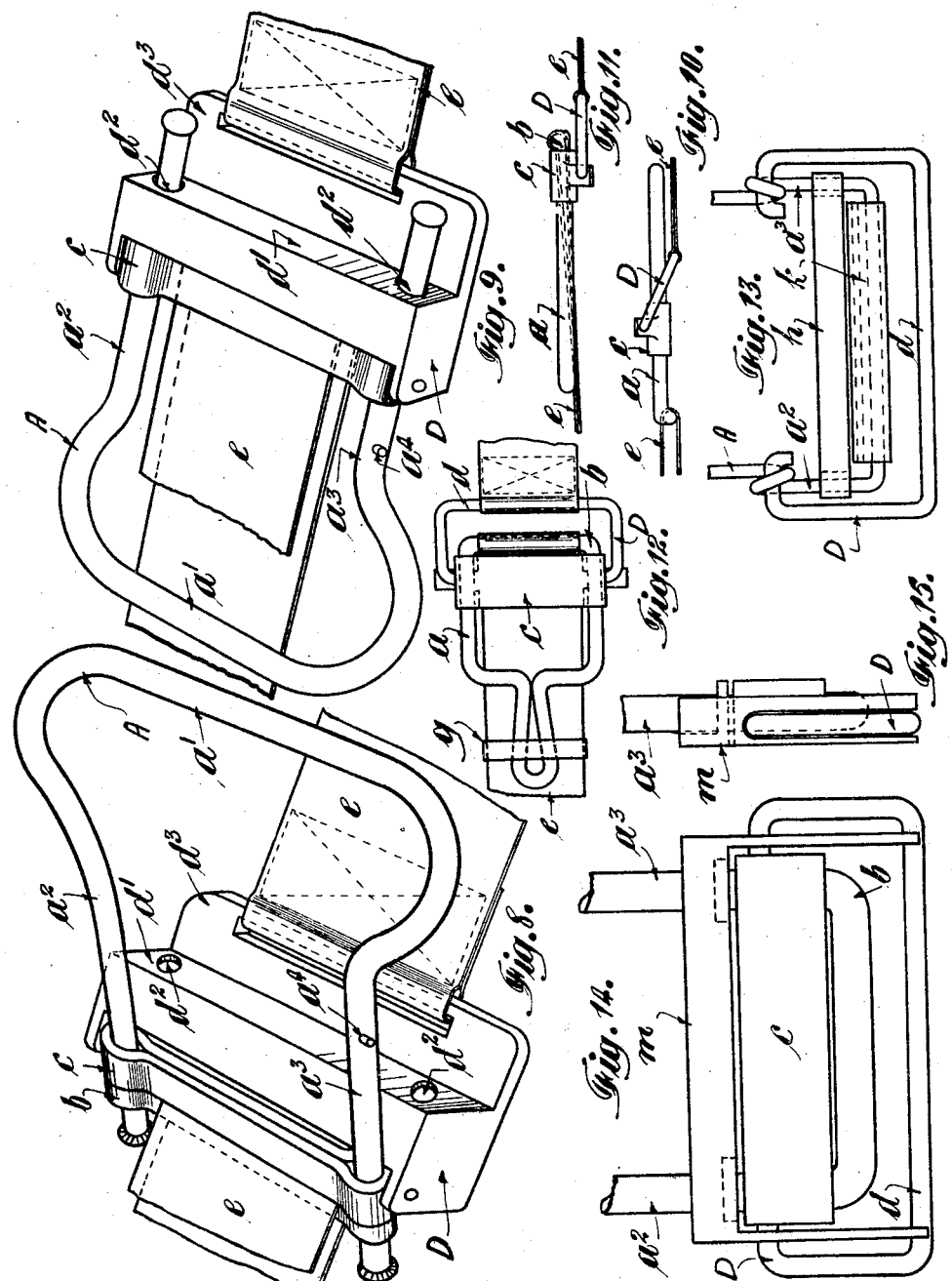

1,571,113

UNITED STATES PATENT OFFICE.

GEORGE FREDERICK FRENCH, OF MANCHESTER, ENGLAND.

BELT OR LIKE TENSIONING AND FASTENING APPLIANCE.

Application filed July 21, 1924. Serial No. 727,300.

*To all whom it may concern:*

Be it known that I, GEORGE FREDERICK FRENCH, a subject of the King of Great Britain and Ireland, residing at Manchester, England, have invented new and useful Improvements in Belt or like Tensioning and Fastening Appliances, of which the following is a specification.

This invention refers to a new or improved tensioning and fastening appliance for belts, bands or straps as used with luggage, packages, boxes and the like, and its object is to provide means for tensioning the belt, band or strap (hereinafter referred to as the belt) which affords a powerful tensioning of the belt, and which may also serve for fastening the belt after tensioning, the ordinary buckle and prong and the usual holes in the belt being dispensed with, although if so desired, they may be retained and used in addition to the improved fastening appliance.

According to the invention, the improved appliance comprises an arrangement of two cross-rods or the like, to one of which one end of the belt is permanently secured, and with the other of which the other end (or another part) of the belt is adapted to engage when requiring to tension the belt. It also comprises an arrangement of a pivoted link and a lever each carrying one of said cross-rods, the lever also carrying a sliding cross-bar and the link being pivotally connected to the lever either directly or through the said cross bar, in such manner that on the lever being folded or moved in one direction the belt is gripped by the cross-bar and tightened while on the lever being moved in the reverse direction, the cross-bar releases the belt and allows it to slacken. In order to utilize the said tension devices for also fastening the belt, (i. e., preventing the belt slackening after tensioning) the link and its pivots are arranged so that when the lever is folded beyond a given extent, a "toggle" is formed, the pull of the belt causing the lever after the link pivots have passed over a "dead" centre, to press against the package, and thus maintain the "toggle." Additional means may, if desired, be provided for locking the lever and link against accidental displacement after the "toggle" is made.

With the ordinary "buckle" fastener, the prong of which enters a hole in the belt, the adjustment (tensioning) of the belt is done by hand and requires considerable strength if the belt is to be tightly adjusted. Further, unless the hole comes at the right point, the belt slackens before the prong enters the hole.

By this invention the tensioning can be effected with little physical effort, and by reason of the "toggle" action, no prongs and holes are required.

Upon the accompanying drawings:—

Fig. 1 illustrates, in perspective, one example of the improved belt-tensioning and fastening appliance, the parts being in the position they occupy prior to tensioning the belt.

Fig. 2 illustrates a like view of the appliance, but with the parts in the position they occupy after tensioning the belt.

Figs. 3 and 3ª illustrate geometric edge views of the appliance shown in Figs. 1 and 2 in three different positions.

Figs. 4 and 5 illustrate like views to Figs. 1 and 2 of another example of the improved appliance.

Figs. 6 and 7 illustrate geometric edge views of the appliance shown in Figs. 4 and 5, in two different positions.

Figs. 8 and 9 illustrate a further example of the improved appliance.

Figs. 10, 11 and 12 illustrate a modification of Figs. 1 and 2.

Figs. 13, and 14 and 15 show other modifications.

Referring to Figs. 1 and 2, the appliance therein shown comprises a lever A composed of a round metal rod folded back upon itself to produce a handle $a^1$ at the bend and two arms or extremities $a^2$, $a^3$ which are of equal length and lie parallel one to the other, and which also lie at a distance apart slightly greater than the width of the belt with which the appliance is to be used. At the ends of the arms $a^2$, $a^3$ is a cross-rod $b$ which may be in one with the lever as shown, or which may be a separate rod welded, riveted or clamped thereto. Said cross rod $b$ may either lie in the plane of the lever arms, see Fig. 1 or lie slightly out of such plane (Figs. 10 and 11).

Upon the said parallel arms $a^2$, $a^3$ of the lever is mounted a flat-sided cross-bar $c$ which is capable of sliding towards and away from the cross-bar $b$ within the limits allowed by the pins $a^4$ and the cross-rod $b$.

Said cross-rod $b$ may be round in cross section as shown in Fig. 1, or it may be flat-sided as shown in Fig. 4, and the opposing edges of the cross-rod and cross-bar may be serrated, as shown dotted in Fig. 4.

To the extremities of the cross-bar $c$ outside the lever A are pivoted the ends of a U shaped loop or link, D the link being of a radius such as to allow its transverse part $d$ to pass over the ends of the lever arms $a^2$, $a^3$ and over the cross-bar $b$, said transverse part lying parallel with the cross-rod B and constituting the second cross-rod aforesaid.

In using the improved appliance, one end of the belt $e$ is permanently fastened to the link D, while the other and free end of the belt, after passing around a package is passed under and over the cross-rod $b$ of the lever A, the free end of the belt pointing away from the link D, and the lever handle and link extending in the same direction as each other, see Fig. 1.

With the free end of the belt held taut by one hand, the lever A is turned over or moved by the other hand in the arc of a circle with the cross-rod $b$ as fulcrum, the cross-bar $c$ sliding down the arms $a^2$, $a^3$ of the lever and firmly nipping the belt between itself and the cross-rod $b$ immediately the lever passes beyond the vertical (see Fig. 3) and the belt being tightened to an extent at least equal to the throw of the lever from the point of connection of the link D with the cross-bar $c$ to the point of contact of the cross-rod $b$, on the package.

On the handle of the lever coming to rest flat upon the package (see Figs. 2 and 3ª) the belt is fully tensioned, the link and lever handle then lying or extending in opposite directions to each other and the cross-bar $c$ tightly nipping the belt at $x$, see figs. 2, 3 and 5ª.

If the pivots of the link D lie in the plane of the lever, the lever will serve only for tensioning the belt, and further means will be required for preventing the lever springing back. This may be a small strap applied to the top face of the belt, and adapted to secure the handle of the lever to the belt, or it may be a loop $g$ loosely threaded on the belt and adapted to slide over the handle of the lever, as shown in Fig. 12, or a chain of wire $f^1$ see Fig. 2 passed below the belt after the toggle is formed at both ends engaging or secured to the lever arms $a^2$, $a^3$.

When, however, the pivots of the link D lie out of the plane of the lever, the effect of moving the lever in the arc of a circle, after threading the belt through the lever, is to cause a reversal of the position of the pivots relatively to the lever i. e., from a position above to a position below the plane of the lever (see Figs. 1 and 2) and thereby produce under the tension of the belt a "toggle" as between (1) the pivots of the link D, (2) the cross-rod $b$ of the lever and (3) the handle $a^1$ of the lever resting on the belt, see Fig. 3ª, thereby locking the lever in the belt-tightened position.

To break the "toggle" and free the belt, the lever A is merely turned back about its fulcrum, which returns the link pivots to their original positions, see Fig. 1.

Although the toggle may usually be sufficient to hold the lever locked against accidental disturbance, additional means may be provided for securing the lever after producing the "toggle".

The means for locking the lever against the accidental breaking of the "toggle" may vary. One arrangement may be a chain or wire passed below the belt after the "toggle" is formed and at both ends engaging or secured to the lever arms. Another arrangement may be a slide on each of the arms, capable of moving over the link pivots to lock them against angular movement, while a further arrangement may comprise a sliding plate on the arms of the link which after making the "toggle" can be caused to lap with the end of the lever.

In a modification the cross-rod $b$ may slide on the lever arms as also the cross-bar $c$, see Figs. 4 and 5, and when so arranged the arms $a^2$, $a^3$ of the lever may after tensioning the belt, be caused to slide endwise and lie over the cross-rod of the link D, see Figs. 5 and 7, and thus lock the lever A against springing back. To prevent accidental withdrawal of the lever from cross-rod $b$ and cross-bar $c$ the ends of the lever arms may be made spherical or slightly enlarged.

The action of this modification in tightening a belt is precisely similar to that of the appliance shown in Figs. 1 and 2, the pivots of the link D being out of the plane of the lever and producing a "toggle" when the lever is turned completely over, and such toggle being locked by sliding the lever endwise until its arms overlie the cross-rod of the link, see Figs. 5 and 7.

Although showing the link D in the form of a length of wire bent to produce a stirrup-like member, it will be understood that the link may take other forms. As shown in Figs. 8 and 9, the link is in the form of a plate hinged to the sliding cross-bar $c$ (in or out of the plane of the lever) at one part, covering up or overlying the cross-rod $b$, at another part, and at its free end formed with a slot to receive the end of the belt requiring to be permanently connected to the appliance.

When the cross-rod $b$ and cross-bar $c$ are slidably mounted on the lever arms, the said plate-like link, which is formed with a shoulder at $d^1$ is provided with large holes $d^2$ for the ends of the rod to pass through to lock the parts after producing the "toggle".

An advantage of this form of link is that it helps to prevent the appliance being arranged the wrong way up when first applying same to the package. The flat end part $d^3$ also serves as a surface for the ends of the lever arms to slide over when locking the "toggle".

In Figs. 10, 11 and 12, the cross-bar $b$ of the lever is made to stand out of the plane of the lever, and thus increase the "toggle" effect when fastening the belt. The cross-bar $c$ is in the form of a flat plate, lying against the lever arms and one part of each end slidably clipping the lever arms, while another part forms a pivot lug for the link, the end of the lug being extended at right angles to the main part to form a "stop" against which the link comes when moved the wrong way.

The handle of the lever may be variously shaped in plan, and when made to the shape shown in Figs. 1 and 4, it may be arched transversely to help it to be flat against the package after tensioning the belt.

In a further modification, Fig. 13, the link D may be pivoted to the lever instead of to the cross-bar $c$ and a second cross-bar $h$ may be fixed across the arms $a^2$, $a^3$ of the lever but upon the lever cross-rod $b$ will be a loose eccentric sleeve $k$ which on the lever being operated will grip the belt between itself and the lever cross-bar $h$.

Figs. 14 and 15 show a modification in which the toggle is locked by a sliding member $m$ mounted on the arms $a^2$, $a^3$ of the lever and adapted to engage with the sides of the link D as shown.

The means of connecting the permanently connected end of the belt to the appliance may be by rivets or stitching or it may be by means of any suitable form of adjustable grip.

When requiring to use a prong or prongs and holes, the lever cross-rod $b$ is finished with a prong or prongs and the belt is provided with holes for the prong or prongs to engage before the belt is finally tensioned.

The improved tensioning appliance may be used for other than belt-tensioning purposes, for example, in tensioning cords, ropes, wires or cables, the ends of which may require to be securely held while the main length is in tension. The appliance is however, chiefly intended for use in tensioning and securing belts as used with luggage and for securing luggage to the carriers of motor vehicles and for like purposes. In such connection it may be of substantial proportions, while for other purposes it may be comparatively small and light. The improved appliance can be used with belts, cords, etc. which are connected at one end to a relatively fixed object, and at the other end require to be connected to another and separate belt, cord, etc.

Finally, it is to be understood that the invention is not restricted to the particular forms and shapes of the parts nor to the precise manner of connecting them together, but that the same can be varied considerably without departing from the invention.

While the invention is described and shown for drawing together and securing the ends of straps or belts, the device may be used alone, or for instance, by being mounted on the front of a trunk or travelling case and the link being adapted to engage with a bracket or lug on the lid of the case, so the turning over of the lever will draw the two parts together, similar retaining means or toggle action, or toggle retaining means may be provided.

What I claim is:—

1. A belt tensioning appliance comprising a rectangular elongated metal frame, one end of which forms one half of a clamp, a metal cross-member slidable along the two longer sides of the frame, and forming the other half of the clamp, a further cross-member, substantially U-shape, pivotally and eccentriclly mounted at its ends on the extremities of the sliding cross-member, the belt to be tensioned being secured at one end to the U-shaped cross-member, and at its other end passing between the two half parts of the clamp, the position of the parts prior to tightening the belt being with the frame part of the clamp lying away from and on that side of the sliding cross-member furthest from the U-shaped cross-member, and after tightening the belt, the position of the parts being with said frame part of the clamp lying against and on the side of the sliding cross-member nearest to the U-shaped member, as set forth.

2. A belt tensioning appliance comprising a rectangular elongated frame, composed of a rod, with enlarged ends, bent U-shape and also composed of a cross-bar slidably mounted on the two longer sides of the frame, one edge of the cross-bar being roughened, a further cross-bar slidably mounted on the longer arms of the frame, also with one edge roughened, and the cross-bars collectively forming a clamp, and a further U-shaped rod eccentrically pivoted to the ends of the second-named cross-bar, the belt to be tensioned being secured at one end to the last-named cross-bar and its other end being passed around the first named sliding cross-bar, as set forth.

3. A belt tensioning appliance comprising a rectangular elongated frame, composed of a rod, with enlarged ends, bent U-shape and also composed of a cross-bar slidably mounted on the two longer sides of the frame, one edge of the cross-bar being roughened, a further cross-bar slidably mounted on the longer sides of the frame, also with one edge roughened, and the cross-bars collectively forming a clamp, said first named cross-bar being pivoted eccentrically to the ends of the second-named cross-bar, and having a flange portion lying to one side of the frame, the holes in said eccentrically pivoted cross-bar, being large enough to allow the extremities of the frame members to pass through and lie clear of the cross-bar, or extend through said holes and lie against the flange, one end of the belt to be tensioned being secured to the flange and the other end being passed between the two cross-bars, as set forth.

In testimony whereof I have signed my name to this specification.

GEORGE FREDERICK FRENCH.